United States Patent
Buryak et al.

(10) Patent No.: US 10,435,493 B2
(45) Date of Patent: Oct. 8, 2019

(54) MULTIMODAL POLYETHYLENE

(71) Applicants: Abu Dhabi Polymers Company Limited (Borouge) LLC, Abu Dhabi (AE); Borealis AG, Vienna (AT)

(72) Inventors: Andrey Buryak, Abu Dhabi (AE); Ashish Kumar, Abu Dhabi (AE); Ibrahim Ali Ahmed, Abu Dhabi (AE)

(73) Assignees: Abu Dhabi Polymers Company Limited (Borouge) LLC, Abu Dhabi (AE); Borealis AG, Vienna (AT)

( * ) Notice: Subject to any disclaimer, the term of this patent is extended or adjusted under 35 U.S.C. 154(b) by 0 days.

(21) Appl. No.: 15/540,138

(22) PCT Filed: Dec. 29, 2015

(86) PCT No.: PCT/EP2015/081343
§ 371 (c)(1),
(2) Date: Jun. 27, 2017

(87) PCT Pub. No.: WO2016/107867
PCT Pub. Date: Jul. 7, 2016

(65) Prior Publication Data
US 2017/0349685 A1 Dec. 7, 2017

(30) Foreign Application Priority Data
Dec. 30, 2014 (EP) .................... 14200665

(51) Int. Cl.
C08L 23/06 (2006.01)
C08F 210/16 (2006.01)
C08L 23/08 (2006.01)
H01B 3/44 (2006.01)
H01B 7/02 (2006.01)
H01B 11/00 (2006.01)
H01B 11/02 (2006.01)
H01B 11/18 (2006.01)

(52) U.S. Cl.
CPC ............ C08F 210/16 (2013.01); C08L 23/06 (2013.01); C08L 23/0815 (2013.01); H01B 3/441 (2013.01); H01B 7/02 (2013.01); C08L 2203/202 (2013.01); C08L 2205/025 (2013.01); C08L 2314/02 (2013.01); H01B 11/002 (2013.01); H01B 11/02 (2013.01); H01B 11/18 (2013.01)

(58) Field of Classification Search
CPC ...... C08L 23/06; C08L 23/0815; C08L 23/08; C08L 2205/025; C08L 2314/02; C08L 2203/202; H01B 3/441; H01B 7/02; H01B 11/002; H01B 11/18; H01B 11/02; C08F 210/16; C08F 4/6546; C08F 4/6555; C08F 4/6492; C08F 2/001; C08F 210/06; C08F 2500/12; C08F 2500/07; C08F 210/08; C08F 2500/05; C08F 2500/04; C08F 4/025
See application file for complete search history.

(56) References Cited

U.S. PATENT DOCUMENTS

| | | | |
|---|---|---|---|
| 5,326,835 | A | 7/1994 | Ahvenainen et al. |
| 5,684,097 | A | 11/1997 | Palmroos et al. |
| 5,767,034 | A | 6/1998 | Diaz-Barrios et al. |
| 6,034,026 | A | 3/2000 | Garoff et al. |
| 6,185,349 | B1 | 2/2001 | Dammert et al. |
| 6,462,161 | B1 | 10/2002 | Cady et al. |
| 7,432,220 | B2 | 10/2008 | Garoff et al. |
| 7,579,551 | B2 | 8/2009 | Van Marion et al. |
| 8,097,678 | B2 | 1/2012 | Van Marion et al. |
| 2010/0105839 | A1 | 4/2010 | Mehta |

FOREIGN PATENT DOCUMENTS

| | | |
|---|---|---|
| CN | 101001893 | 7/2007 |
| CN | 102197082 | 9/2011 |
| EP | 1961777 | 8/2008 |
| JP | 2013227545 | 11/2013 |
| TW | 201417114 | 5/2014 |
| WO | 2005095475 | 6/2005 |

OTHER PUBLICATIONS

Hagstrom, B., Conference on Polymer Processing (The Polymer Processing Society), *Extended Abstracts and Final Programme*, Gothenburg Aug. 19-21, 1997, 4:13.

*Primary Examiner* — Nathan M Nutter
(74) *Attorney, Agent, or Firm* — Diederiks & Whitelaw, PLC.

(57) ABSTRACT

A multimodal polyethylene copolymer suitable for use in cable insulation comprising:
(III) 45 to 55 wt % of a lower molecular weight component which is an ethylene copolymer of ethylene and at least one C3-12 alpha olefin comonomer, said LMW component having a density of 940 to 962 kg/m$^3$ and an MFR$_2$ of 50 to 500 g/10 min;
(IV) 55 to 45 wt % of a higher molecular weight ethylene copolymer component of ethylene and at least one C3-12 alpha olefin comonomer;
wherein said multimodal polyethylene copolymer has a density of 940 to 950 kg/m$^3$, an MFR$_2$ of 0.05 to 2.0 g/10 min and preferably at least one of crystallization half time>3.0 mins at 120.5° C., a crystallization half time>5.0 mins at 121° C. or a crystallization half time>10.0 mins at 122° C.

23 Claims, 1 Drawing Sheet

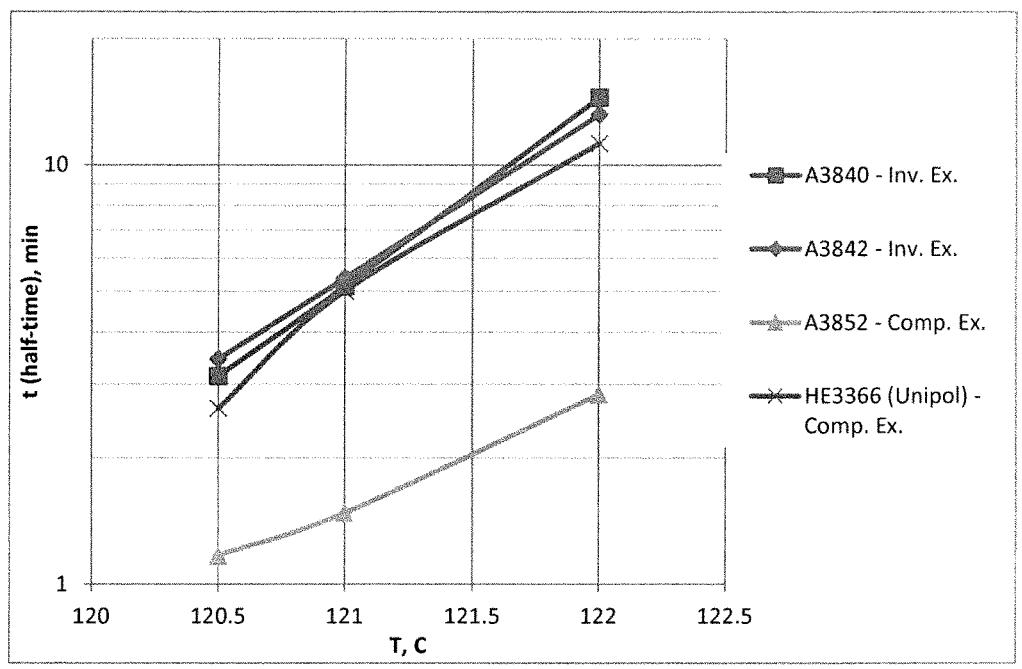
Crystallization half-time at different temp.

MULTIMODAL POLYETHYLENE

CROSS-REFERENCE TO RELATED APPLICATIONS

This application represents the U.S. National Phase of International Application number PCT/EP2015/081343 entitled "Multimodal Polyethylene" filed 29 Dec. 2015, which claims priority from and the benefit of European patent application No. 14200665.9 filed on 30 Dec. 2014. The entire contents of these applications are incorporated herein by reference.

This invention relates to a multimodal high density polyethylene copolymer for use in the insulation layer of a wire or cable, such as a data cable or telecommunications cable and to cables made from the copolymer. The invention also relates to a process for the production of said copolymer. In particular, the copolymer of use in the insulation layer is a multimodal HDPE which exhibits slow crystallisation speed (and hence long crystallization half time) and is hence able to form an insulation layer without defects often associated with multimodal polyethylene. It is also compatible with filling compounds such as petroleum jelly often used in cables to prevent ingress of water.

BACKGROUND ART

Cables such as data cables and telecommunications cables have been used for many years to transmit information. In any cable, a conductor is protected from external influence by one or more sheathing layers which act to shield, protect and insulate the conductor. The conductor is typically a metal wire such as a copper wire which is surrounded by one or more sheathing layers. In their simplest form, a cable may just be copper wire provided with a single layer of insulation. It will be appreciated that much more complex cable designs exist.

In a conventional method, cables are made in an extrusion process in which the conductor is covered with molten polymer which is then cooled in a series of water baths thus creating an insulating layer. The insulation layer is typically a polyethylene polymer.

It is important that the polyethylene used for cable insulation does not have a high crystallization speed (short crystallization halftime), i.e. the polyethylene should not crystallise too quickly. If a polymer has a very fast crystallization rate then the cable insulation layer will shrink on cooling. Shrinkage of the insulation layer is a process which the skilled person wants to avoid. Also, adhesion of the insulation layer to the conductor is poor if crystallisation speed is too rapid, resulting in inferior electrical properties of the produced cable.

It is known in the art that crystallization speed can be slowed by, for example, decreasing polymer density. However, lower density polymers often exhibit poorer mechanical properties. Also, lower density results in higher adsorption of fillers that can be present in the cable, in particular petroleum jelly. Petroleum jelly is routinely used in telephone cable construction to support a group of cables. The use of petroleum jelly was first proposed in 1968 when Bell Telephone Laboratories reported a new cable design where air space in a cable was filled with a dielectric compound consisting of polyethylene and petroleum jelly. In the case of a rupture of the outer sheath, the jelly prevents water ingress, stabilizes electrical transmission, permits use of an economical sheath design, and prevents water from flowing along the cable length.

If the cable insulation material adsorbs the petroleum jelly then cable performance is again compromised. Although the manufacture of traditional copper multipair telephone cables in which petroleum jelly is used is in decline, there remains a need to continue to produce these products in cases where it is more cost effective to extend an existing network rather than install new fibre optic technology. In addition, similar cable filling technology continues to be used for fibre optic cables.

The present inventors targeted a multimodal polyethylene polymer composition for use in the manufacture of the insulation layer in a cable such as a data cable or telecommunications cable. That cable could be a fibre optic cable or a traditional telecommunications or data cable. The cable can comprise fillers such as petroleum jelly.

In this regard, it is known that bimodal polyethylene grades offer superior balance of certain mechanical properties when compared to unimodal polyethylene grades. Multimodal polymers also tend to possess improved processability (corresponding to lower melt pressure in the extruder) due to their broader molecular weight distribution.

Unfortunately, bimodal polyethylenes have faster crystallization speed (shorter crystallization half times) than their unimodal counterparts, resulting in higher shrinkage and inferior adhesion to the conductor in the cable. Also, the resistance to petroleum jelly adsorption is worse in a multimodal polymer making them less than ideal candidates in cables where petroleum jelly or other fillers are present. Whilst therefore, there are benefits to using a multimodal polyethylene in terms of their mechanical and rheological properties, those benefits are outweighed by the negative impact multimodality has on insulation layer shrinkage and adhesion to conductor and possible compatibility issues with fillers such as petroleum jelly.

Therefore there is the need to combine the good mechanical and rheological properties of multimodal polyethylene with slower crystallization speed (longer crystallization half times) and good petroleum jelly adsorption resistance of a unimodal polyethylene. The present inventors have now found that certain multimodal polyethylene copolymers characterised by their high density, relatively high MFR, density split between fractions, and copolymeric structure offer an excellent balance of properties for cable insulation. The polymers offer slow crystallisation speed (long crystallization half times) and good resistance to petroleum jelly. Being multimodal, the polymers also possess excellent mechanical properties, e.g. in terms of their balance of stiffness/stress crack resistance and excellent rheological properties, e.g. in terms of shear thinning index, meaning the polymers are readily processed into cables.

Bimodal polyethylene has been used in the manufacture of cable insulation before. In EP1,159,350 some multimodal polyethylene copolymers are described as supports for use in fibre optic cables. The polymers are however based on polymers with very low MFR, e.g. $MFR_5$ of 0.1 to 2.0 g/10 min. The MFR appears to offer a compromise between processing properties and dimensional stability. Moreover, in the examples, the LMW component in the polymer is a homopolymer. Our higher MFR values are advantageous for extrusion.

EP1,739,110 describes multimodal polymers for use in cable and film applications but these polymers are of low density and therefore lack the mechanical performance of the higher density polymers of the present invention.

The present inventors have therefore devised new polymers with an ideal balance of MFR, density, and density split based on a two copolymer components. They also exhibit advantageous slow crystallization speed (long crystallization half times) as our polymers are based on two copolymer fractions.

SUMMARY OF INVENTION

Viewed from one aspect the invention provides a multimodal polyethylene copolymer suitable for use in cable insulation comprising:
(I) 45 to 55 wt % of a lower molecular weight component which is an ethylene copolymer of ethylene and at least one C3-12 alpha olefin comonomer, said LMW component having a density of 940 to 962 kg/m$^3$ and an MFR$_2$ of 50 to 500 g/10 min;
(II) 55 to 45 wt % of a higher molecular weight ethylene copolymer component of ethylene and at least one C3-12 alpha olefin comonomer;
wherein said multimodal polyethylene copolymer has a density of 940 to 950 kg/m$^3$, an MFR$_2$ of 0.05 to 2.0 g/10 min and at least one of
(i) a crystallization half time>3.0 mins at 120.5° C.;
(ii) a crystallization half time>5.0 mins at 121° C.; or
(iii) a crystallization half time>10.0 mins at 122° C.

In one embodiment, the polymer of invention has at least two of
(i) a crystallization half time>3.0 mins at 120.5° C.,
(ii) a crystallization half time>5.0 min at 121° C. or
(iii) a crystallization half time>10.0 mins at 122° C.

Preferably, the polymer of the invention has all of the above crystallization half times.

The multimodal polyethylene copolymer of the invention is preferably made using a Ziegler Natta catalyst.

Viewed from another aspect the invention provides a cable, such as a data cable or telecommunications cable, comprising a conductor surrounded by an insulation layer wherein said insulation layer comprises, e.g. consists essentially of, a multimodal polyethylene copolymer as herein before defined.

Viewed from another aspect the invention provides a cable, such as a data cable or telecommunications cable, comprising a conductor surrounded by an insulation layer wherein said insulation layer comprises, e.g. consists essentially of, a multimodal polyethylene copolymer as herein before defined and wherein said cable comprises at least one filler such as petroleum jelly. The filler is preferably present and in contact with the insulation layer.

Viewed from another aspect the invention provides the use of the multimodal polyethylene copolymer as hereinbefore defined in the manufacture of a cable, e.g. in the manufacture of the insulating layer of a cable, such as a data cable or telecommunications cable. In one embodiment, the cable of the invention additionally comprises at least one filler such as petroleum jelly.

Viewed from another aspect the invention provides a process for the preparation of a multimodal polyethylene copolymer as herein before defined comprising;
polymerising ethylene and at least one C3-12 alpha olefin comonomer in the presence of a Ziegler Natta catalyst so as to form said lower molecular weight component (I); and subsequently
polymerising ethylene and at least one C3-12 alpha olefin comonomer in the presence of component (I) and in the presence of the same Ziegler Natta catalyst so as to form said higher molecular weight component (II) and hence form said multimodal polyethylene copolymer as herein before defined.

The invention further comprises extruding the formed polymer around a conductor to form a cable. If filler is present, that can be added at any convenient time, e.g. to a cooling step of insulation layer.

Definitions

All parameters mentioned above and below are measured according to test methods set out before the examples.

DETAILED DESCRIPTION OF INVENTION

It has been found that the high density polyethylene copolymer according to the invention provides an improved material for cable insulation, in particular for data or telecommunications cables, especially a cable comprising at least one filler such as petroleum jelly. The multimodal polymer of the invention possesses a slow crystallisation speed (long crystallisation half-life) and resistance to the adsorption of petroleum jelly which is characteristic of a unimodal polyethylene. However, as the polymer of the invention is a multimodal polymer, it offers the advantageous properties above, in combination with the improved rheology, mechanical properties and processability associated with multimodal polymers.

The polymer of the invention is a multimodal high density ethylene copolymer containing at least two ethylene copolymer fractions. The multimodal polyethylene copolymer of the invention comprises a lower Mw fraction which is an ethylene copolymer fraction comprising ethylene copolymerised with at least one C3-12 alpha olefin. The terms component and fraction can be used interchangeably herein.

The HMW component, which by definition is different from the LMW component, is also a copolymer of ethylene and at least one C3-12 alpha olefin but is obviously of a higher Mw than the LMW component.

In an ethylene copolymer fraction, the majority by mole of monomer residues present are derived from ethylene monomer units. The comonomer contribution in the HMW component preferably is up to 10% by mol, more preferably up to 5% by mol in any copolymer fraction. In the LMW fraction, the amounts of comonomer tend to be less than in the HMW component and are sufficient to create a polymer having the density requirements of the invention.

Ideally, there are very low levels of comonomer present in the LMW copolymer fraction such as 0.05 to 3.0 mol %, e.g. 0.1 to 2.0 mol %.

The overall comonomer content in the multimodal polyethylene copolymer as a whole may be 0.1 to 4.0% e.g. 0.5 to 3.0 mol %.

The copolymerisable monomer or monomers present in any copolymer component are C3-12 alpha olefin comonomers, particularly singly or multiply ethylenically unsaturated comonomers, in particular C3-12-alpha olefins such as propene, but-1-ene, hex-1-ene, oct-1-ene, and 4-methyl-pent-1-ene. The use of 1-hexene and 1-butene is particularly preferred. Ideally there is only one comonomer present. Ideally that comonomer is 1-butene. It is therefore preferred if both LMW and HMW components are ethylene 1-butene copolymers.

The polymer of the invention is multimodal and therefore comprises at least two components. It is generally preferred if the higher molecular weight (HMW) component has an Mw of at least 5000 more than the lower molecular weight (LMW) component, such as at least 10,000 more. Alternatively viewed, the MFR$_2$ of the HMW component is lower than the MFR$_2$ of the LMW component.

The HDPE of the invention is multimodal. Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

It is preferred if the polymer of the invention is bimodal.

The polymer of the invention has an $MFR_2$ of 0.05 to 2.0 g/10 min, preferably 0.2 to 2.0 g/10 min, more preferably 0.5 to 1.5 g/10 min. This narrowly defined $MFR_2$ range is crucial for the slow crystallisation speed and resistance to filler. Often multimodal HDPEs for cable applications have lower MFR than taught herein. We are able to provide insulation layers in cables using a high MFR polymer and hence a more extrudable material without loss of other crucial properties such as structural integrity. The density of the multimodal ethylene copolymer is 940 to 950 kg/m³. The polymers of the invention are therefore high density polyethylenes, HDPE. More preferably, the polymer has a density of 942 to 948 kg/m³, such as 943 to 947 kg/m³.

Preferably, the polyethylene copolymer has a molecular weight distribution Mw/Mn, being the ratio of the weight average molecular weight Mw and the number average molecular weight Mn, of more than 9.0, more preferably more than 10.0, such as 11.0 to 20.0.

The multimodal ethylene copolymer preferably has an Mw/Mn of 30.0 or below, more preferably of 25.0 or below.

The weight average molecular weight Mw of the multimodal ethylene copolymer of the invention preferably is at least 50,000, more preferably at least 70,000. Furthermore, the Mw of the composition preferably is at most 200,000, more preferably at most 150,000.

The shear thinning index (SHI 5.0/300) may be at least 16.0, such as at least 20.0. Ideally the SHI is in the range of 20.0 to 50.0, preferably 25.0 to 45.0.

The crystallisation half times of the polymer of the invention are important. At 120.5° C., crystallisation half time is preferably more than 3.0 mins. At 121° C., crystallisation half time is preferably more than 5.0 mins. At 122° C., crystallisation half time is preferably more than 10.0 mins, such as more than 11.5 mins, especially more than 12.0 or more than 12.5 mins.

The copolymer of the invention has a petroleum jelly adsorption of 5.0 to 9.0 wt %, preferably 5.5 to 8.5 wt %.

As noted above, the polymers of the invention preferably comprise a lower molecular weight ethylene copolymer component (I) and a higher molecular weight ethylene copolymer component (II). The weight ratio of LMW fraction (I) to HMW fraction (II) in the composition is in the range 45:55 to 55:45, more preferably 47:53 to 53:47. It has been found therefore that the best results are obtained when the HMW component is present at around the same percentage as the LMW component or even slightly less, e.g. 47 to 50 wt % of the HMW component (II) and 53 to 50 wt % fraction (I).

An ideal polymer is therefore a lower molecular weight ethylene copolymer component (I) (e.g. with butene comonomer) with a higher molecular weight component (II) which is an ethylene copolymer component (e.g. with a butene comonomer).

The lower molecular weight fraction (I) has an $MFR_2$ of 50 to 500 g/10 min, preferably 200 to 450 g/10 min. A range of 200 to 400 g/10 min is preferred.

This high $MFR_2$ in the LMW fraction ensures that there is a large difference in Mw between LMW and HMW components and is important in giving the multimodal polyethylene copolymer of the invention the good rheological properties which we observe.

Fraction (I) is an ethylene copolymer with at least one C3-12 alpha olefin comonomer, preferably 1-butene or 1-hexene.

The component (I) may have a density of 940 to 962 kg/m³, preferably 950 to 962 kg/m³. The use of a copolymer in this component slows crystallisation speed.

The HMW component is an ethylene copolymer. Its properties are chosen such that the desired final density and MFR are achieved. It has a lower $MFR_2$ than the LMW component and a lower density. The $MFR_2$ of the HMW component should be determined or calculated to be less than 0.15 g/10 min.

Where herein features of fractions (I) and/or (II) of the composition of the present invention are given, these values are generally valid for the cases in which they can be directly measured on the respective fraction, e.g. when the fraction is separately produced or produced in the first stage of a multistage process. However, the composition may also be and preferably is produced in a multistage process wherein e.g. fractions (I) and (II) are produced in subsequent stages. In such a case, the properties of the fractions produced in the second step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

A multimodal (e.g. bimodal) polyethylene as hereinbefore described may be produced by mechanical blending two or more polyethylenes (e.g. monomodal polyethylenes) having differently centred maxima in their molecular weight distributions. The monomodal polyethylenes required for blending may be available commercially or may be prepared using any conventional procedure known to the skilled man in the art. Each of the polyethylenes used in a blend and/or the final polymer composition may have the properties hereinbefore described for the lower molecular weight component, higher molecular weight component and the composition, respectively.

However, it is preferred if the copolymer of the invention is formed in a multistage process. The process of the invention preferably involves:

polymerising ethylene and at least one C3-12 alpha olefin comonomer so as to form a lower molecular weight component (I) as herein defined; and subsequently polymerising ethylene and at least one C3-12 alpha olefin comonomer in the presence of component (I) so as to form a higher molecular weight component (II) and hence to form the desired multimodal polyethylene copolymer of the invention. The same Ziegler Natta catalyst is used in both stages of the process and is transferred from step (I) to step (II) along with component (I).

It is preferred if at least one component is produced in a gas-phase reaction.

Further preferred, one of the fractions (1) and (II) of the polyethylene composition, preferably fraction (I), is produced in a slurry reaction, preferably in a loop reactor, and one of the fractions (I) and (II), preferably fraction (II), is produced in a gas-phase reaction.

Preferably, the multimodal polyethylene composition may be produced by polymerisation using conditions which create a multimodal (e.g. bimodal) polymer product using a Ziegler Natta catalyst system using a two or more stage, i.e. multistage, polymerisation process with different process conditions in the different stages or zones (e.g. different temperatures, pressures, polymerisation media, hydrogen partial pressures, etc).

Preferably, the multimodal (e.g. bimodal) composition is produced by a multistage ethylene polymerisation, e.g. using a series of reactors. A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Polymer compositions produced in a multistage process are also designated as "in-situ" blends.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process for producing the composition according to the invention are such as described in EP 517 868, i.e. the production of fractions (I) and (II) is carried out as a combination of slurry polymerisation for fraction (I)/gas-phase polymerisation for fraction (II). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 20% by weight, preferably 1 to 10% by weight, more preferably 1 to 5% by weight, of the total composition is produced. The prepolymer is preferably an ethylene homopolymer (High Density PE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end. Any prepolymer is deemed part of the LMW component herein.

The polymerisation catalyst is a Ziegler-Natta (ZN) catalyst. The catalyst may be supported, e.g. with conventional supports including magnesium dichloride based supports or silica. Preferably the catalyst is a ZN catalyst, more preferably the catalyst is silica supported ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis, EP 0 688 794 and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the two or more reactors, the different molecular-weight-distribution curves of these polymers together forming a molecular-weight-distribution curve having a broad maximum or two or more maxima, i.e. the end product is a multimodal polymer mixture, such as bimodal mixture.

It is preferred that the base resin, i.e. the entirety of all polymeric constituents, of the composition according to the invention is a bimodal polyethylene mixture consisting of fractions (I) and (II), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively lower molecular copolymer is produced in one stage, preferably the first stage, owing to a high content of chain-transfer agent (hydrogen gas), whereas the higher molecular copolymer having a higher content of comonomer is produced in another stage, preferably the second stage. The order of these stages may, however, be reversed.

In the preferred embodiment of the polymerisation, in which a loop reactor is followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 100 to 800 moles of $H_2$/kmoles of ethylene are added to the reactor, when the LMW fraction is produced in this reactor, and 50 to 500 moles of $H_2$/kmoles of ethylene are added to the gas phase reactor when this reactor is producing the HMW fraction.

In the production of the composition of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

The polyethylene composition may also contain minor quantities of additives such as pigments, nucleating agents, antistatic agents, fillers, antioxidants, etc., generally in amounts of up to 10% by weight, preferably up to 5% by weight.

Optionally, additives or other polymer components can be added to the composition during the compounding step in the amount as described above. Preferably, the composition of the invention obtained from the reactor is compounded in the extruder together with additives in a manner known in the art.

The polyethylene polymer of the invention may also be combined with other polymer components such as other polymers of the invention, with other HDPEs or with other polymers such as LLDPE or LDPE. However the insulation layer of cables of the invention is preferably at least 90 wt % of the polymer of the invention, such as at least 95 wt %. In one embodiment, the insulation layer consists essentially of the polymer of the invention. The term "consists essentially of" means that the polymer of the invention is the only "non additive" polyolefin present. It will be appreciated however that such a polymer may contain standard polymer additives some of which might be supported on a polyolefin (a so called masterbatch as is well known in the art). The term "consists essentially of" does not exclude the presence of such a supported additive or a filler such as petroleum jelly.

The insulation layer in any cable may be 0.2 to 5 mm in thickness.

Applications

Still further, the present invention relates to a cable comprising a conductor surrounded by an insulation layer comprising a polyethylene copolymer as described above and to the use of such a polyethylene copolymer for the production of the insulation layer in a cable. Cables of the invention are preferably data cables or telecommunications cables. Cables of the invention may contain fillers such as petroleum jelly. The polymer of the invention could also be used in the manufacture of fibre optic cable sheathing. Other cables of interest are pair cables and coaxial cables.

The cables of the invention can comprise a single coating layer (i.e. the insulation layer defined herein), or multiple layers, e.g. an insulation layer and an external jacketing layer. It is preferred if the insulation layer of the invention is adjacent the conductor. It is preferred if the insulation layer is the only layer present.

The skilled person will appreciate that cables can be formed comprising multiple conductors in bundles. The polymer of the invention is suitable for the formation of such a cable.

The cable can be provided with a filler as is well known in the art. Cable manufacture can be effected conventionally. It is highly preferred therefore if the cable of the invention is a telecommunications or data cable. These are also referred to as CuPM—copper multi pair cables. The insulation layer surrounds the copper conductor and the cables can then be twisted into multi pairs. In one embodiment there is no other layer apart from HDPE insulation surrounding a copper conductor, e.g. for a data cable. Alternatively, there may also be a jacketing layer present.

In particular, for telecommunications cables there may also be a jacketing layer present. Also, the cable interior may be filled with a filler such as petroleum jelly to avoid moisture penetration.

It will be appreciated that any parameter mentioned above is measured according to the detailed test given below. In any parameter where a narrower and broader embodiment are disclosed, those embodiments are disclosed in connection with the narrower and broader embodiments of other parameters.

The invention will now be described with reference to the following non limiting examples and FIG. 1.

FIG. 1 depicts crystallization half-times as a function of temperature.

TEST METHODS

Melt Flow Rate

The melt flow rate (MFR) is determined according to ISO 1133 and is indicated in g/10 min. The MFR is an indication of the melt viscosity of the polymer. The MFR is determined at 190° C. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components of the blend according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Molecular Weight

Molecular weight averages, molecular weight distribution (Mn, Mw, Mz MWD)

Molecular weight averages (Mz, Mw and Mn), Molecular weight distribution (MWD) and its broadness, described by Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 mg/L of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS} = 19 \times 10^{-3}$ mL/g, $\alpha_{PS} = 0.655$ $K_{PE} = 39 \times 10^{-3}$ mL/g, $\alpha_{PE} = 0.725$ $K_{PP} = 19 \times 10^{-3}$ mL/g, $\alpha_{PP} = 0.725$ A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Tensile Properties

Tensile properties were measured on injection moulded samples according to ISO 527-2, Specimen type Multipurpose bar 1 A, 4 mm thick. Tensile modulus was measured at a speed of 1 mm/min. Sample preparation was done acc ISO 1872-2

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. Standard single-pulse excitation was employed utilising the transient NOE at short recycle delays of 3 s {pollard04, klimke06} and the RS-HEPT decoupling scheme {fillip05, griffin07}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-butene were observed (randall89) and all contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.84 ppm assigned to the $*B2$ sites, accounting for the number of reporting sites per comonomer:

$B = I_{*B2}$

With no other signals indicative of other comonomer sequences, i.e. consecutive comonomer incorporation, observed the total 1-butene comonomer content was calculated based solely on the amount of isolated 1-butene sequences:

$B_{total} = B$

The relative content of ethylene was quantified using the integral of the bulk methylene (δ+) signals at 30.00 ppm:

$E = (½)*I_{δ+}$

The total ethylene comonomer content was calculated based the bulk methylene signals and accounting for ethylene units present in other observed comonomer sequences or end-groups:

$E_{total} = E + (5/2)*B$

The total mole fraction of 1-butene in the polymer was then calculated as:

$fB = (B_{total})/(E_{total} + B_{total})$

The total comonomer incorporation of 1-butene in mole percent was calculated from the mole fraction in the usual manner:

$B[\text{mol \%}] = 100*fB$

The total comonomer incorporation of 1-butene in weight percent was calculated from the mole fraction in the standard manner:

$B[\text{wt \%}] = 100*(fB*56.11)/((fB*56.11)+(fH*84.16)+((1-(fB+fH))*28.05))$ klimke06

Klimke, K., Parkinson, M., Piel, C., Kaminsky, W., Spiess, H. W., Wilhelm, M., Macromol. Chem. Phys. 2006; 207:382.

pollard04

Pollard, M., Klimke, K., Graf, R., Spiess, H. W., Wilhelm, M., Sperber, O., Piel, C., Kaminsky, W., Macromolecules 2004; 37:813.

filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
randall89
J. Randall, Macromol. Sci., Rev. Macromol. Chem. Phys. 1989, C29, 201.

Rheology

The characterization of polymer melts by dynamic shear measurements complies with ISO standards 6721-1 and 6721-10. The measurements were performed on an Anton Paar MCR301 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at T° C. (T by 230° C. for PP and 190° C. for PE) applying a frequency range between 0.0154 and 500 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where
$\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus, G', the shear loss modulus, G", the complex shear modulus, G*, the complex shear viscosity, $\eta^*$, the dynamic shear viscosity, $\eta'$, the out-of-phase component of the complex shear viscosity, $\eta''$, and the loss tangent, tan $\eta$, which can be expressed as follows:

$$G' = \frac{\sigma_0}{\gamma_0} \cos\delta \quad [Pa] \quad (3)$$

$$G'' = \frac{\sigma_0}{\gamma_0} \sin\delta \quad [Pa] \quad (4)$$

$$G^* = G' + iG'' \quad [Pa] \quad (5)$$

$$\eta^* = \eta' - i\eta'' \quad [Pa] \quad (6)$$

$$\eta' = \frac{G''}{\omega} \quad [Pa \cdot s] \quad (7)$$

$$\eta'' = \frac{G'}{\omega} \quad [Pa \cdot s] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation 9.

$$EI(x) = G' \text{ for } (G''=x \text{ kPa}) \quad [Pa] \quad (9)$$

For example, the EI(5 kPa) is the defined by the value of the storage modulus G', determined for a value of G" equal to 5 kPa.

The determination of so-called Shear Thinning Indexes is done, as described in equation 10.

$$SHI(x/y) = \frac{Eta^* \text{ for } (G^* = x \text{ kPa})}{Eta^* \text{ for } (G^* = y \text{ kPa})} \quad [Pa] \quad (10)$$

For example, the SHI (5.0/300) is defined by the value of the complex viscosity, in Pa·s, determined for a value of G* equal to 5.0 kPa, divided by the value of the complex viscosity, in Pa·s, determined for a value of G* equal to 300 kPa. The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "—Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995

[3] Definition of terms relating to the non-ultimate mechanical properties of polymers, Pure & Appl. Chem., Vol. 70, No. 3, pp. 701-754, 1998

Zero Shear Viscosity

The determination of the so-called Zero Shear Viscosity shall be done in the Rheoplus software by the use of the Carreau-Yasuda model. The Carreau-Yasuda equation describes the viscosity curve of a material with Newtonian regions at low shear rates and a shear thinning region (power law region) at medium shear rates.

The Carreau-Yasuda model is defined according with Rheoplus software by equation 1:

$$y = (y_0 - y_{inf}) \cdot (1 + (\lambda \cdot x)^a)^{\frac{n-1}{a}} + y_{inf} \quad (1)$$

where
x angular frequency in rad/s
y complex viscosity in Pa·s
$y_0$ complex viscosity for angular frequency→0 (zero shear viscosity) in Pa·s
$y_{inf}$ complex viscosity at angular frequency→∞ (infinite viscosity) in Pa·s
a Carreau constant
n Power index
$\lambda$ relaxation time in s This procedure will ensure a significant improvement of interlaboratory accuracy (reproducibility) for the Zero Shear Viscosity itself and Zero Shear Viscosity derived parameters (e.g. SHI(0/50). SHI(0/100). etc).

Isothermal Crystallisation

The isothermal crystallization rates were measured according to ISO 11357-7, first edition 2002 May 1 using a TA Instruments DSC Q2000 differential scanning calorimeter equipped with an RCA 90 cooling accessory. The specimens (3.5±0.2 mg) in Al crucibles were melted by heating to 210° C. at the heating rate of 20 K/min, hold for 5 min, then cooled to the isothermal temperature at the cooling rate of 40 K/min. The isothermal temperatures of 120.5° C., 121° C. and 122° C. were selected. From crystallization exotherms the time to reach the maximum crystallization rate (peak $t_{max}$), the time to reach the relative crystallinity of 0.5 (t 50%), and the enthalpy of crystallisation ($\Delta H_c$) were calculated.

Petroleum Jelly Test

Petroleum jelly resistance was measured according IEC 60811-407. As the drop point of the jelly was 68° C., a 60° C. pre-heating was chosen.

The following conditions are used:
Conductor thickness: 0.5 mm
Insulation thickness: 0.24 mm
Petroleum jelly: Insojell 2332, drop point 68° C.
Cable length is as in standard (600, 800 and 600 mm)

Experimental

Complex Preparation:

87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between Bomag-A and 2-ethyl-1-hexanol was 1:1.83.

Solid Catalyst Component Preparation:

275 kg silica (ES747JR of Crossfield, having average particle size of 20 mm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.

The polymers of the invention were prepared as outlined in table 1 in a Borstar process using the catalyst above and TEAL cocatalyst:

TABLE 1

|  | Lot | Inv Ex 1 | Inv Ex 2 |
|---|---|---|---|
| A1 - PREPOLY |  |  |  |
| Temperature | ° C. | 70 | 70 |
| Pressure | bar | 62 | 62 |
| catalyst feed | g/h | 12.0 | 10.2 |
| cocatalyst feed | g/h | 4.4 | 3.8 |
| C2 feed | kg/h | 2.0 | 2.0 |
| H2 feed | g/h | 4.8 | 4.8 |
| C3 feed | kg/h | 42 | 42 |
| production rate | kg/h | 1.9 | 1.9 |
| Split | wt-% | 2 | 2 |

TABLE 1-continued

|  | Lot | Inv Ex 1 | Inv Ex 2 |
|---|---|---|---|
| A2 - LOOP |  |  |  |
| Temperature | ° C. | 85 | 85 |
| Pressure | Bar | 56 | 56 |
| A2 cocatalyst feed | g/h | 4.4 | 3.7 |
| C2 feed | kg/h | 46 | 46 |
| H2 feed | g/h | 90 | 67 |
| C4 feed | kg/h | 1.7 | 3.5 |
| C3 feed | kg/h | 82 | 82 |
| H2/C2 ratio | mol/kmol | 282 | 255 |
| C4/C2 ratio | mol/kmol | 216 | 535 |
| production rate | kg/h | 43.8 | 44.0 |
| Split | wt-% | 51 | 49 |
| MFR 190° C. 2.16 kg | g/10 min | 234 | 240 |
| Comonomer content | mol % | 0.4 | 1.0 |
| Mn | g/mol | 5400 | 5400 |
| Mw/Mn |  | 5.2 | 5.2 |
| Density | kg/m3 | 960.7 | 952.1 |
| A3 - GPR |  |  |  |
| Temperature | ° C. | 85 | 85 |
| Pressure | bar | 20 | 20 |
| C2 feed | kg/h | 50 | 52 |
| H2 feed | g/h | 26 | 46 |
| C4 feed | kg/h | 4.2 | 2.7 |
| H2/C2 ratio | mol/kmol | 40 | 58 |
| C4/C2 ratio | mol/kmol | 146 | 102 |
| production rate | kg/h | 40.8 | 44.0 |
| Split | wt-% | 47 | 49 |
| Comonomer |  | C4 | C4 |
| JSW CIM90P |  |  |  |
| Feed | kg/h | 221 | 221 |
| screw speed | Rpm | 349 | 349 |
| throttle valve opening | Mm | 17 | 17 |
| SEI | kWh/kg | 192 | 189 |
| melt temperature | ° C. | 237 | 237 |
| FINAL PROPERTIES | Pellet |  |  |
| MFR 190° C. 2.16 kg | g/10 min | 0.88 | 0.85 |
| MFR 190° C. 5.0 kg | g/10 min | 3.5 | 3.2 |
| C4 | mol % | 1.1 | 1.2 |
| Density | kg/m3 | 945.6 | 944.4 |

The properties of the inventive examples are given in Table 2 relative to a comparative example 1 which is a multimodal ethylene butene copolymer with a homopolymer in the LMW component made using a Ziegler Natta catalyst and to Comparative example 2, a unimodal HDPE produced with Cr-based catalyst in Unipol process.

TABLE 2

|  | Final MFR2 g/10 min | Final dens. kg/m3 | LMW fraction MFR2 g/10 min | LMW fraction dens. kg/m3 | HMW fraction split wt % |
|---|---|---|---|---|---|
| Inv. Ex. 1 | 0.88 | 945.6 | 234 | 960.7 | 47 |
| Inv. Ex. 2 | 0.85 | 944.4 | 240 | 952.1 | 49 |
| Comp. Ex 1. | 0.9 | 945.2 | 107 | 970.1 | 50 |
| Comp. Ex 2 | 0.75 | 946 |  |  |  |

|  | Mn g/mol | Mw g/mol | Mw/Mn g/mol | Tensile modulus MPa | Stress at yield MPa | Strain at break % |
|---|---|---|---|---|---|---|
| Inv. Ex. 1 | 9145 | 117500 | 12.8 | 656 | 19.6 | 378 |
| Inv. Ex. 2 | 10250 | 119500 | 11.7 | 627 | 19 | 392 |

TABLE 3

| | SHI (5/300) | Eta 0 Pa*s | Isothermal cryst. half time | | | Petroleum jelly adsorption wt % |
|---|---|---|---|---|---|---|
| | | | 120.5° C. Min | 121° C. min | 122° C. min | |
| Inv. Ex. 1 | 35.1 | 27,964 | 3.14 | 5.14 | 14.49 | 7.8 |
| Inv. Ex. 2 | 33.2 | 28,786 | 3.45 | 5.38 | 13.19 | 6.7 |
| Comp. Ex. 1 | 32.2 | 35,030 | 1.17 | 1.48 | 2.84 | 8.5 |
| Comp. Ex. 2 | 36.4 | 189,454 | 2.63 | 5.01 | 11.26 | 6.6 |

Table 3 shows crystallization half time as well as rheological broadness (shear thinning index) and petroleum jelly adsorption results for inventive and comparative compositions. Crystallization speed measurement results in graphical form are depicted on FIG. 1.

All inventive and comparative examples have very similar densities ranging between 944-946 kg/m³. Therefore any differences in properties will result from the differences in the polymer structure rather than the differences in the final density. The same applies to the melt flow rate. Second, due to specific polymer design of the inventive examples no. 1 and 2, significantly lower crystallization speed was achieved, especially compared to the comparative example 1—a bimodal HDPE with homopolymer in the loop and hence a very high density loop component. The bimodal grades of inventive examples 1 and 2 compare favourably with comparative example 2—unimodal HDPE grade produced with Cr-based catalyst. The bimodal grades of the invention possess a slightly lower crystallization speed than a unimodal grade but also possess superior mechanical and rheological properties due to their bimodal nature. The latter is obvious from the fact that comparative example 2 has significantly higher zero-shear rate viscosity, resulting in higher melt pressure and higher extrusion temperatures required during cable extrusion. Finally, one can notice that the inventive example 1 and particularly the inventive example 2 have petroleum jelly adsorption results close or identical to that of the reference while the results of the other bimodal comparative example are higher. The results therefore show that a specific combination of design parameters of the inventive bimodal examples enables a low crystallization speed characteristic of a unimodal reference grade combined with very good resistance to petroleum jelly adsorption, combined with the superior mechanical properties of bimodal polyethylene.

The invention claimed is:

1. A multimodal polyethylene copolymer suitable for use in cable insulation comprising:
   (I) 45 to 55 wt % of a lower molecular weight component which is an ethylene copolymer of ethylene and at least one C3-12 alpha olefin comonomer, said LMW component having a density of 940 to 962 kg/m³ and an MFR$_2$ of 50 to 500 g/10 min;
   (II) 55 to 45 wt % of a higher molecular weight ethylene copolymer component of ethylene and at least one C3-12 alpha olefin comonomer;
   wherein said multimodal polyethylene copolymer has a density of 940 to 950 kg/m³, an MFR$_2$ of 0.05 to 2.0 g/10 min and at least one of a crystallization half time>3.0 mins at 120.5° C., a crystallization half time>5.0 mins at 121° C. or a crystallization half time>10.0 mins at 122° C., when measured according to ISO 11357-7.

2. A multimodal polyethylene copolymer as claimed in claim 1 having a density of 942 to 948 kg/m³.

3. A multimodal polyethylene copolymer as claimed in claim 1 having an MFR$_2$ of 0.2 to 2.0 g/10 min.

4. A multimodal polyethylene copolymer as claimed in claim 1 prepared using a Ziegler Natta catalyst.

5. A multimodal polyethylene copolymer as claimed in claim 1 wherein said HMW copolymer component comprises at least one of 1-butene, 1-hexene and 1-octene.

6. A multimodal polyethylene copolymer as claimed in claim 1 having 47 to 53 wt % of a HMW component (II) and 53 to 47 wt % LMW component (I).

7. A multimodal polyethylene copolymer as claimed in claim 1 having a shear thinning index (SHI 5.0/300) in the range of 20.0 to 50.0.

8. A multimodal polyethylene copolymer as claimed in claim 1 wherein said LMW polymer is a copolymer with the comonomer 1-butene.

9. A multimodal polyethylene copolymer as claimed in claim 1 having at least two of
   (i) a crystallization half time>3.0 mins at 120.5° C.,
   (ii) a crystallization half time>5.0 mins at 121° C. or
   (iii) a crystallization half time>10.0 mins at 122° C.

10. A multimodal polyethylene copolymer as claimed in any preceding claim having wherein the LMW component has an MFR$_2$ of 200 to 400 g/10 min.

11. A multimodal polyethylene copolymer as claimed in claim 1 wherein the LMW component has a density of 950 to 962 kg/m³.

12. A multimodal polyethylene copolymer as claimed in claim 1 wherein the copolymer has a petroleum jelly adsorption of 5.0 to 9.0 wt %.

13. A cable comprising a conductor surrounded by an insulation layer comprising a copolymer as claimed in claim 1.

14. A cable as claimed in claim 13 further comprising at least one filler.

15. A cable as claimed in claim 13 which is a data cable or telecommunications cable.

16. A multimodal polyethylene copolymer as claimed in claim 1 having a density of 943 to 947 kg/m³.

17. A multimodal polyethylene copolymer as claimed in claim 1 having an MFR$_2$ of 0.5 to 1.5 g/10 min.

18. A multimodal polyethylene copolymer as claimed in claim 1 having a shear thinning index (SHI 5.0/300) in the range of 25.0 to 45.0.

19. A multimodal polyethylene copolymer as claimed in claim 9 having all of
   (i) a crystallization half time>3.0 mins at 120.5° C.,
   (ii) a crystallization half time>5.0 mins at 121° C. or
   (iii) a crystallization half time>10.0 mins at 122° C.

20. A multimodal polyethylene copolymer as claimed in claim 9 having a crystallization half time>11.5 mins at 122° C.

21. A multimodal polyethylene copolymer as claimed in claim 1 wherein the copolymer has a petroleum jelly adsorption of 5.5 to 8.5 wt %.

22. A cable as claimed in claim 13, wherein said insulation layer is adjacent said conductor.

23. A cable as claimed in claim 14 wherein said filler is petroleum jelly.

* * * * *